United States Patent [19]
Langstein et al.

[11] Patent Number: 6,015,841
[45] Date of Patent: Jan. 18, 2000

[54] INITIATOR SYSTEMS CONTAINING VANADIUM TETRACHLORIDE FOR THE (CO)POLYMERIZATION OF ISOOLEFINS

[75] Inventors: Gerhard Langstein, Kürten; Martin Bohnenpoll, Leverkusen; Uwe Denninger, Bergisch Gladbach; Werner Obrecht, Moers, all of Germany; Peter Plesch, North Staffordshire, United Kingdom

[73] Assignee: Bayer AG, Germany

[21] Appl. No.: 08/884,969

[22] Filed: Jun. 30, 1997

[30] Foreign Application Priority Data

Jul. 9, 1996 [DE] Germany ............... 196 27 529

[51] Int. Cl.[7] ............... C08F 2/50; C08F 4/20; C08F 10/04
[52] U.S. Cl. ............... 522/29; 522/66; 522/184; 522/186; 522/188; 526/139; 526/141; 526/142; 526/143; 526/144; 526/237; 502/227
[58] Field of Search ............... 522/29, 66, 186, 522/188, 184; 526/141, 142, 143, 237, 139, 144

[56] References Cited

U.S. PATENT DOCUMENTS

| | | | |
|---|---|---|---|
| 3,326,879 | 6/1967 | Yamada et al. | 260/93.7 |
| 3,897,322 | 7/1975 | Marek et al. | 522/184 |
| 3,997,417 | 12/1976 | Marek et al. | 204/159.24 |
| 4,808,387 | 2/1989 | Datta et al. | 423/265 |
| 4,871,523 | 10/1989 | Datta et al. | 423/265 |
| 5,473,029 | 12/1995 | Osman | 526/135 |
| 5,516,862 | 5/1996 | Yamamoto et al. | 526/142 |

*Primary Examiner*—Susan W. Berman
*Attorney, Agent, or Firm*—Connolly & Hutz

[57] ABSTRACT

This invention relates to an initiator system for the polymerization of isoolefins having 4 to 16 carbon atoms, optionally with monomers polymerizable with isoolefins, the system consisting of or one or more aromatic or heteroaromatic, polycyclic hydrocarbons and an aged, organic solution of vanadium tetrachloride, wherein the concentration of the vanadium tetrachloride is 0.01 mmol to 500 mmol per liter of solvent and the molar ratio of aged vanadium tetrachloride to polycyclic hydrocarbons is in the range from 100:1 to 1:100.

It is possible by means of the initiator system according to the invention to produce polyisoolefins, in particular butyl rubbers, at relatively high temperatures with only a low gel content and of a sufficiently high molecular weight.

20 Claims, 1 Drawing Sheet

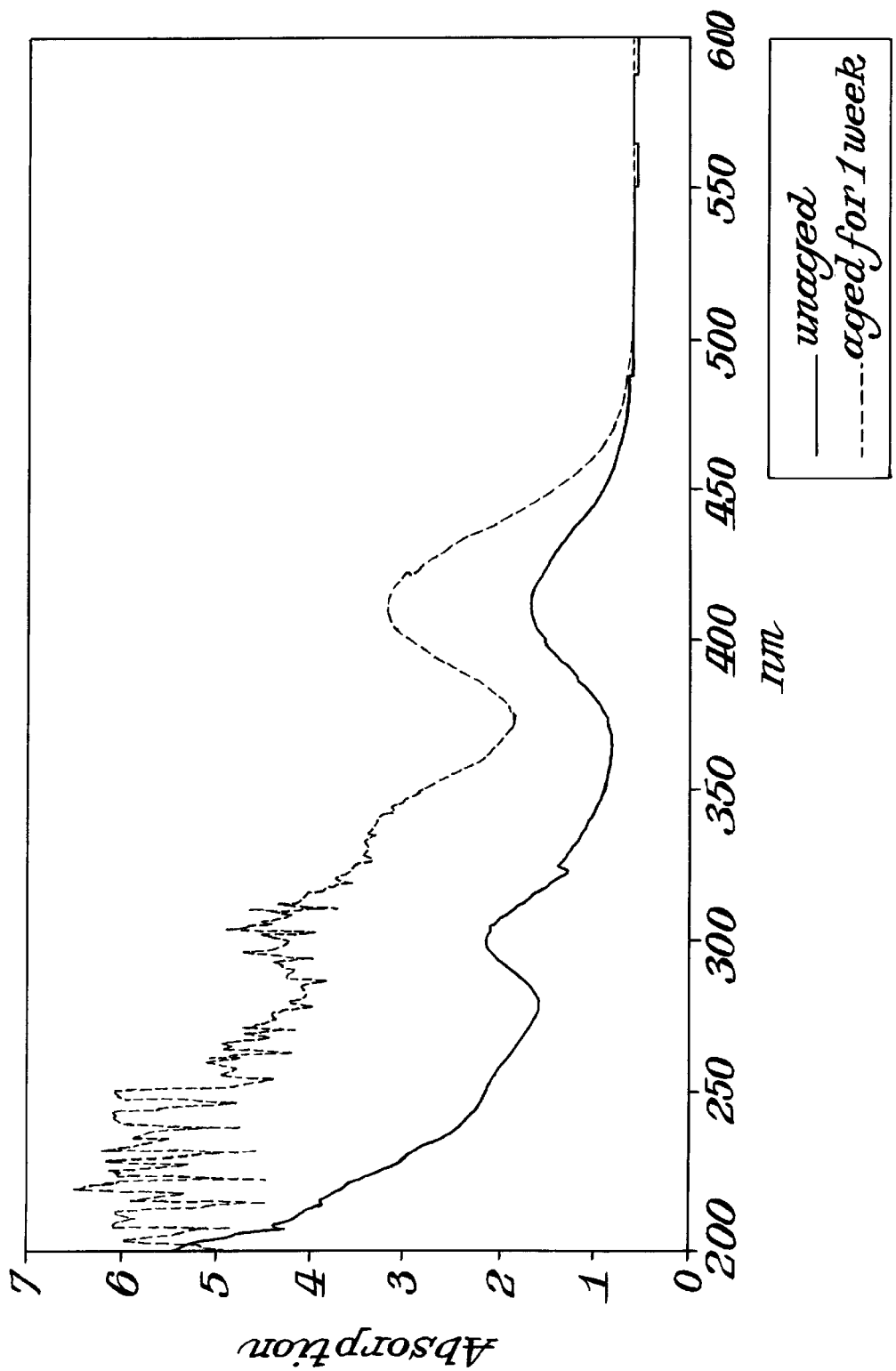

6,015,841

INITIATOR SYSTEMS CONTAINING VANADIUM TETRACHLORIDE FOR THE (CO)POLYMERIZATION OF ISOOLEFINS

BACKGROUND OF THE INVENTION

1. Field of the Invention

The present invention provides a novel initiator system containing vanadium for the (co)polymerisation of isoolefins, a process for the production of the novel initiator system and the use thereof for the production of polymers from isoolefins optionally with monomers copolymerisable with isoolefins, in particular for the production of butyl rubbers.

2. Description of the Prior Art

The process currently used to produce butyl rubber is known, for example, from *Ullmanns Encyclopedia of Industrial Chemistry*, volume A 23, 1993. In the slurry process, isobutene is cationically copolymerised with isoprene with methyl chloride as the process solvent using aluminium chloride as the initiator with the addition of small quantities of water or hydrogen chloride. It is also known to initiate this copolymerisation using a combination of tertiary halides combined with Lewis acids (Kennedy, Marechal, *Carbocationic Polymerisation*, Wiley 1982). A feature common to both processes is that polymerisation temperatures of approximately −100° C. are necessary in order to achieve a molecular weight which is sufficiently high for use in the rubber-processing industry, which entails very costly cooling of the reaction. In these processes, as a general rule molecular weights become ever lower as temperature increases.

It is also known to copolymerise isobutene with various comonomers at temperatures of approximately −40° C. using vanadium tetrachloride as the initiator, either in pure form or as a solution in heptane, with optional activation by light or the addition of aromatic compounds (Miroslav Marek et al., *J. Polym. Sci. Polym. Chem. Ed.* 16, 2759–2770 (1978); J. Pilar, L. Toman, M. Marek, *J. Polym. Sci. Polym. Chem. Ed.* 14, 2399–2405 (1976); L. Toman, M. Marek, *Makromol. Chem.* 177, 3325–3343 (1976); M. Marek et al., U.S. Pat. No. 3,997,417; L. Toman, M. Marek, *J. Macromol. Sci.-Chem.*, A15(8), 1533–1543 (1981); M. Marek, *J. Polym. Sci. Symp.* 56, 149–158 (1976)). While the copolymers produced using this process do indeed have a rubbery consistency, they are insoluble due to their elevated gel content and precipitate during polymerisation in an alkane solution or in bulk, so causing serious problems for the industrial performance of this reaction.

The homopolymerisation of isobutene with vanadium tetrachloride as the initiator and ammonia (L. Toman, M. Marek, *Polymer Bull.* 6, 570–576 (1982)) as the co-initiator is described in bulk and in solution (solvent: heptane). Polymerisation was performed in the temperature range from −10° C. to −75° C. in darkness. Polymerisation does not proceed in this process without the presence of ammonia. Yields are dependent upon the molar ratio of vanadium tetrachloride to ammonia and reach a maximum at a ratio of 1:1. The molecular weights achieved are independent of this ratio and rise with increasing monomer concentration. A molecular weight (determined viscosimetrically) of 2015 kg/mol was achieved in bulk polymerisation at −75° C. In heptane at a monomer concentration of 4.65 mol/l, the value was only half so high. The molecular weights achieved decrease as temperature rises. Other polymer characteristics, in particular the gel content, are not stated.

The polymerisation of olefinic hydrocarbons with vanadium tetrachloride in combination with the most varied aromatic compounds as coinitiators in the temperature range from −110° C. to +110° C. is known from U.S. Pat. No. 3,326,879. A disadvantage of the processes described in the stated US patent is that some of the listed coinitiators, if used in a quantity of greater than 100 mol. %, inhibit polymerisation and, as our own tests have shown, the only copolymers of isobutene with isoprene which are obtained are those having an elevated gel content. This also applies to the process described in U.S. Pat. No. 3,997,417 for the polymerisation and copolymerisation of monomers with olefinic double bonds in the presence of polyvalent metal halides, for example vanadium tetrachloride, in the presence of light in the temperature range from −140° C. to +30° C. Thus, according to Example 12, copolymers of isobutylene and isoprene are obtained which have a gel content of 15% and, according to Example 11, copolymers of isobutylene and butadiene which have a gel content of 10%. Depending upon the reaction conditions, molecular weights are between 75 and 550 kg/mol. The polymerisation process described in U.S. Pat. No. 3,998,713 using tetravalent metal halides in combination with alkaline earth or alkali metals or the hydrides or amalgams thereof as co-initiators with irradiation in the temperature range from 0° C. to −140° C. is also unsuitable for polymerising or copolymerising monoolefinic and diolefinic compounds. Here too, an elevated gel content is obtained on polymerisation. Even at low temperatures, the molecular weights of the polymers are unsatisfactory. The same also applies to the polymerisation and copolymerisation of monomers having olefinic double bonds in the presence of, for example, halides of tetravalent vanadium with or without light described in DE 2 125 800 and DE 2 119 305. The achieved molecular weights of the polymers are unsatisfactory and the gel content of the polymers, for example when butyl rubbers are produced, is too high.

It has now surprisingly been found that the above-stated disadvantages during the (co)polymerisation of isoolefins can be avoided if isoolefins are copolymerised in the presence of the initiator system containing vanadium described below.

SUMMARY OF THE INVENTION

The present invention accordingly provides an initiator system for the polymerisation of isoolefins having 4 to 16 carbon atoms, optionally with monomers copolymerisable with isoolefins, the system consisting of one or more aromatic or heteroaromatic, polycyclic hydrocarbons (coinitiator) and an aged, organic solution of vanadium tetrachloride (initiator), wherein the concentration of the vanadium tetrachloride is 0.01 mmol to 500 mmol per liter of solvent and the molar ratio of aged vanadium tetrachloride to polycyclic hydrocarbons is in the range from 100:1 to 1:100.

BRIEF DESCRIPTION OF THE DRAWING

The sole FIGURE is a graph illustrating the UV spectra of aged and unaged solutions of vanadium chloride.

DESCRIPTION OF THE PREFERRED EMBODIMENTS

Aromatic or heteroaromatic, polycyclic (at least bicyclic) hydrocarbons are used alone or in combination with each other as coinitiators in the initiator system according to the invention. The aromatic or heteroaromatic polycyclic hydrocarbons may optionally be substituted with alkyl or alkylene groups. Further possible substituents are halogen, cyano groups, nitro groups, alkoxy groups and substituted phenyl groups. Bi-, tri- and tetracyclic aromatic or heteroaromatic hydrocarbons are preferably used. Examples of suitable coinitiators are, for example, naphthalene, anthracene, indene, coumarone, carbazole, N-vinylcarbazole, biphenyl, p-terphenyl, acenaphthene, acenaphthylene, fluoranthene, fluorene, phenanthrene, pyrene, together with octylated diphenylamine (Vulkanox OCD from Bayer).

The conditions for ageing the initiator are dependent upon the solvent used. Suitable solvents for ageing the initiator for the purposes of the invention are hydrocarbons, in particular aliphatic and/or aromatic hydrocarbons without functional substituents and having 4 to 20 carbon atoms and a boiling point of above −20° C. Preferred solvents are those having a boiling point of above +20° C. and a melting point of below 20° C., with those solvents having a melting point of below 0° C. being particularly preferred. These solvents may be used alone or combined with each other. Examples of such hydrocarbons are: pentane, hexane, 2,3-dimethylbutane, heptane, cyclopentane, cyclohexane and/or methylcyclohexane, with pentane and/or hexane being particularly preferred.

Ageing of the initiator may, in principle, be performed over a broad temperature range, essentially limited only by the melting point and the boiling point of the solvent used. A preferred temperature range is from 0 to 40° C., with +10 to +30° C. being particularly preferred. Ageing may be performed in the presence of light or in darkness. Ageing is preferably performed in daylight or under artificial light (in the visible or ultraviolet range).

Optimum ageing time is dependent upon the solvent used, the temperature, the quantity of light and the concentration of the solution. Ageing times of a few minutes to several weeks are possible, with ageing times of a few hours to a few days being preferred and ageing times of one hour to 24 hours, in particular of 24 hours, being particularly preferred.

Ageing of the vanadium tetrachloride in the appropriate organic solvent may be performed in the absence or presence of the coinitiators. In a preferred embodiment, ageing proceeds in the absence of the coinitiators.

The present invention accordingly also provides a process for the production of the initiator system described above, which process is characterised in that the vanadium tetrachloride is dissolved in one of the organic solvents described above and the resultant solution is subjected to an ageing process in the presence of light or in the absence of light, wherein the concentration of the vanadium tetrachloride is 0.01 mmol to 500 mmol per liter of solvent.

The present invention moreover provides the use of the initiator system for the production of polyisoolefins by polymerising isoolefins having 4 to 16 carbon atoms, optionally with conjugated diolefins having 4 to 6 carbon atoms and/or cationically polymerisable mono- or polyunsaturated compounds having 4 to 16 carbon atoms, at temperatures of −100° C. to +20° C., preferably from −60° C. to 0° C., in particular from −45° C. to −15° C., and pressures from 0.001 to 70 bar, preferably from 0.1 to 2 bar.

In order to remove contaminants, in particular moisture, during polymerisation, alkali and alkaline earth metals, the amalgams thereof with mercury or hydrogen compounds of the metals of groups I, II, III and IV of the periodic system may be added to the monomer mixture as desiccants. In this manner, the required quantity of catalyst may be reduced.

The concentration of the aged vanadium tetrachloride is preferably 0.01 mmol to 500 mmol per liter of solvent. The molar ratio of aged vanadium tetrachloride to the above-mentioned polycyclic hydrocarbons is preferably in the range from 10:1 to 1:10.

Isoolefins having 4 to 16 carbon atoms, preferably 4 to 8 carbon atoms, which may be mentioned by way of example are: isobutene, 2-methyl-1-butene, 3-methyl-1-butene, 4-methyl-1-pentene and β-pinene, preferably isobutene and 2-methyl-1-butene; conjugated diolefins having 4 to 6 carbon atoms which may be mentioned are: isoprene, butadiene, 2,3-dimethylbutadiene, cyclopentadiene, methylcyclopentadiene, 1,3-cyclohexadiene, preferably isoprene and cationically polymerisable, mono- or polyunsaturated organic compounds having 4 to 16 carbon atoms, preferably 4 to 10 carbon atoms which may be mentioned are: styrene, 4-methylstyrene, divinylbenzene, α-methylstyrene, dimethylfulvene, preferably 4-methylstyrene and divinylbenzene.

In the event that the process according to the invention is to be used for copolymerising the stated isoolefins with the stated conjugated diolefins and/or the cationically polymerisable, mono- or polyunsaturated organic compounds, a weight ratio of isoolefins to diolefins and unsaturated organic compounds of 95:5 to 99.5:0.5 is preferred.

Polymerisation may, in principle, be performed at various pressures. Pressures both above and below atmospheric are permissible. Pressure is preferably adjusted in such a manner that the reaction mixture boils at the desired reaction temperature so that the heat of reaction arising during polymerisation may be dissipated by boiling cooling. The ideal pressure is determined by the boiling points and quantity of the solvents used, the boiling points of the monomers used and the desired reaction temperature.

If, for example, polymerisation is performed without solvent (bulk polymerisation), the ideal pressure is calculated using the following formula:

$$p = 49071249.2 * e^{\frac{-2869}{T}}$$

In this formula, T denotes the reaction temperature in Kelvin and p the pressure in mbar.

In specific cases, the pressure actually used may deviate from this ideal value by up to 100 mbar not only to greater but also to lesser values. Deviations of <50 mbar are preferred, with deviations of <20 mbar being particularly preferred.

Polymerisation may be performed both continuously and batch-wise.

In a preferred embodiment, polymerisation is performed batch-wise, for example in the following manner:

The reactor, which has been precooled to the reaction temperature, is charged with the solvent, the coinitiator and the monomers. The initiator is then pumped in at a rate of 1 ml/hour to 1000 ml/hour until an exothermic reaction starts. All operations are performed under protective gas or a slight vacuum. The course of the reaction is monitored by means of the evolution of heat. Once the exothermic reaction has come to an end, it is terminated with a phenolic antioxidant, such as for example 2,6-di-tert.-butyl-4-methylphenol, dissolved in ethanol.

It is of great significance to the polymerisation according to the invention that the aged vanadium tetrachloride hydrocarbon solutions (initiator) are used in combination with the stated coinitiators.

Suitable polymerisation solvents for the purposes of the invention are aliphatic and/or aromatic (optionally halogenated) hydrocarbons without functional substituents. Preferred solvents are those having a melting point of below 20° C. Particularly preferred solvents are those having a melting point of below 0° C. Examples of suitable aliphatic solvents are: methyl chloride, methylene chloride, chloroform, carbon tetrachloride, propane, butane, pentane, hexane, 2,3-dimethylbutane, heptane, cyclohexane, methylcyclohexane, chloroethane, 1,1-dichloroethane, 1,2-dichloroethane, 1,1,1-trichloroethane, 1,1,2,2-tetrachloroethane, pentachloroethane, hexachloroethane, 1-chloropropane, 2-chloropropane, 1,2-dichloropropane, 1,2,3-trichloropropane, 1-chlorobutane, 2-chlorobutane, 1,4-dichlorobutane, 1-chloro-2-methylpropane, 1-chloropentane, 2,4-dimethylpentane, 2,2,4-trimethylpentane, dodecane, 1-chlorododecane, petroleum ether, chlorocyclohexane, cyclododecane and/or decalin. Examples of aromatic solvents are: benzene, toluene, chlorobenzene, 1,2-dichlorobenzene, ethylbenzene, xylene, 1,2,3-trimethylbenzene, 1,2,4-trimethylbenzene, 1,3,5-trimethylbenzene, diethylbenzene, 1,2,3,4-tetramethylbenzene, 1,2,3,5-tetramethylbenzene, 1,2,4,5-tetramethylbenzene, pentamethylbenzene, 1-isopropyl-4-methylbenzene, 1,3-diisopropylbenzene, 1,4-diisopropylbenzene, 1-tert.-butyl-3,5-dimethylbenzene and/or 1,3,5-triisopropylbenzene.

It is particularly surprising that it is possible by using the initiator system according to the invention consisting of an aged organic solution of vanadium tetrachloride (initiator) in combination with one or more aromatic or heteroaromatic polycyclic hydrocarbons (coinitiator) to produce polyisoolefins, in particular butyl rubbers, at relatively high temperatures (−40° C.) having only a low gel content and a sufficiently high molecular weight, although it would have been expected according to the prior art, that, when using vanadium tetrachloride as the initiator, the polymerisation of isoolefins is associated with a relatively high gel content, often combined with a molecular weight which is insufficiently high for rubber applications.

EXAMPLES

Experimental Details

Gel contents were determined in toluene after a dissolution time of 24 hours at 30° C. with a sample concentration of 12.5 g/l. Insoluble fractions were separated by ultracentrifugation (1 hour at 20000 revolutions/minute and 25° C.).

The solution viscosity $\eta$ of the soluble fractions was determined in toluene at 30° C. by Ubbelohde capillary viscosimetry.

Molecular weight Mv calculated from solution viscosity was determined using the following formula: $\ln(Mv)= 12.48+1.565*\ln\eta$.

GPC. investigations with GPC-viscosimetry coupling were performed in a instrument equipped with eight Styragel columns of sizes 100, 1000 (2×), $10^4$ (2×), $10^5$ (2×) and $10^6$ nm. Total column length is 976 cm. The eluent, THF, was pumped at 0.5 ml/min. 1.93 ml fractions were measured online in an Ubbelohde viscosimeter. $M_v$ values were calculated with the constants $K=5\times10^{-4}$ dl/g and $\alpha=0.6$. Evaluation was performed by universal Benoit calibration using PC software from Kirschbaum & Schroeder GmbH.

Mooney viscosities were measured after 8 minutes at a temperature of 125° C.

UV spectra of the catalyst solutions were measured using a Perkin-Elmer UV spectrometer at room temperature with an undiluted catalyst solution in a cuvette with a pathlength of 0.01 mm.

Unless otherwise stated, the solvents used were purified before use by distillation over calcium hydride under an argon atmosphere.

The isobutene used in the polymerisations was dried by being passed through a column packed with sodium on aluminium oxide.

The isoprene used was filtered through a column with dried aluminium oxide in order to remove the stabiliser and used in this form for the polymerisation.

The other comonomers used were purified before use by distillation over calcium hydride under an argon atmosphere.

Synthesis of Initiator (ageing of $VCl_4$)

Example 1

500 ml of hexane were introduced into a vessel under argon. 24.1 g (0.125 mol) of vanadium tetrachloride were added. The solution was exposed to daylight with gentle stirring for 7 days, wherein the red coloration became distinctly deeper and the occurrence of small quantities of a solid was observed. The extent of this color change may be seen by comparing the UV spectra, which are shown together in the Figure.

The precipitated solid (<<1%) was filtered out under argon. The remaining solution was stored under argon and used in this form to initiate polymerisation.

If correctly stored, this solution may be used for several weeks. Any slight turbidity occurring during storage may be removed by filtration.

Example 2

As Example 1, the ageing time being 2 h in this case.

Example 3

100 ml of 2,3-dimethylbutane were introduced into a vessel under argon. 4.8188 g (0.025 mol) of vanadium tetrachloride were added. The solution was exposed to daylight with gentle stirring for 9 days, wherein the brown coloration became distinctly deeper and the occurrence of small quantities of a solid was observed. The precipitated solid was filtered out under argon. The remaining solution was used in this form to initiate polymerisation.

Example 4

500 ml of toluene dried by distilling off $LiAlH_4$ are combined at room temperature with 125 mmol of $VCl_4$ and stirred for 2 hours. The resultant slurry becomes deep black. The precipitate is filtered out.

Example 5

50 ml of methylcyclohexane dried by distilling off $CaH_2$ are combined at room temperature with 12.5 mmol $VCl_4$ and stirred for 24 hours. The clear solution is deep red and is used for polymerisation without being filtered.

Example 6

100 ml of heptane dried by distilling off $CaH_2$ are combined under argon with 25 mmol of $VCl_4$ and stirred for 24 hours. A deep red, clear solution was produced.

Polymerisations

Example 7

500 g of isobutene and 11.918 g (1.96 mol. %) of isoprene were introduced into a vessel under argon with exclusion of light at a temperature of −40° C. 0.036 g of anthracene and 1.6 ml of initiator solution from Example 1 were added.

After a reaction period of 15 minutes, the exothermic reaction was terminated due to the increasing viscosity by adding a precooled solution of 1 g of 2,2'-methylene-bis(4-methyl-6-tert.-butylphenol) (Vulkanox BKF from Bayer AG, Leverkusen) in 250 ml of ethanol. Once the liquid had been decanted, the precipitated polymer was washed with 2.5 l of methanol, rolled out to a thin sheet and dried for 1 day under a vacuum at 50° C. (Yield: 91.3 g=17.8%).

The resultant slightly brown polymer had a Mooney value of 55, a gel content of 3.1% and an intrinsic viscosity of 1.0632 dl/g.

Example 8 (Comparative Example)

600 g of isobutene and 13.63 g (200 mmol) of isoprene were introduced into a vessel under argon at a temperature of −40° C. 4 ml of initiator solution from Example 2 were added in the presence of light. After a reaction period of 15 minutes, the exothermic reaction was terminated due to the increasing viscosity by adding a precooled solution of 1 g of 2,2'-methylene-bis(4-methyl-6-tert.-butyl-phenol) (Vulkanox BKF from Bayer AG, Leverkusen) in 250 ml of ethanol. Once the liquid had been decanted, the precipitated polymer was washed with 2.5 l of methanol, rolled out to a thin sheet and dried for 1 day under a vacuum at 50° C. (Yield: 92.6 g=15%).

The resultant slightly brown polymer had a Mooney value of 98, a gel content of 43%. The intrinsic viscosity of the soluble fractions was 1.55 dl/g.

Example 9

The polymerisation from Example 7 was repeated, with the difference that, instead of the initiator from Example 1, the initiator solution from Example 3 was used. Yield: 110 g=21.5%.

The resultant polymer had a Mooney value of 60.5, a gel content of 3.5% and an intrinsic viscosity of 1.359 dl/g.

Example 10 (Comparative Example)

The polymerisation from Example 7 was repeated, with the difference that, instead of the initiator from Example 1, the equimolar quantity of vanadium tetrachloride dissolved in hexane was used. Yield: 124 g=24%.

The resultant polymer had a Mooney value of 65, a gel content of 23.3% and an intrinsic viscosity of 0.64 dl/g.

Example 11

598 g of isobutene and 13.63 g (200 mmol) of isoprene were introduced into a vessel under argon at a temperature of −40° C. 8 ml of initiator solution, produced in the same manner as in Example 1 with an ageing time of 96 h, were added in the presence of light. After a reaction period of 20 minutes, the exothermic reaction was terminated due to the increasing viscosity by adding a precooled solution of 1 g of 2,2'-methylene-bis(4-methyl-6-tert.-butylphenol) (Vulkanox BKF from Bayer AG, Leverkusen) in 250 ml of ethanol. Once the liquid had been decanted, the precipitated polymer was washed with 2.5 l of methanol, rolled out to a thin sheet and dried for 1 day under a vacuum at 50° C. (Yield: 74.2 g=12.1%).

The resultant slightly brown polymer had a Mooney value (125° C., 1+8') of 30 and a gel content of 43%. The intrinsic viscosity of the soluble fractions was 0.6 dl/g.

Example 12

600 g of isobutene and 13.63 g (200 mmol) of isoprene were introduced into a vessel under argon at a temperature of −40° C. 10 ml of initiator solution, produced in the same manner as in Example 6 with an ageing time of 168 h, were added with the exclusion of light. After a reaction period of 17 minutes, the exothermic reaction was terminated due to the increasing viscosity by adding a precooled solution of 1 g of 2,2'-methylene-bis(4-methyl-6-tert.-butylphenol) (Vulkanox BKF from Bayer AG, Leverkusen) in 250 ml of ethanol. Once the liquid had been decanted, the precipitated polymer was washed with 2.5 l of methanol; rolled out to a thin sheet and dried for 1 day under a vacuum at 50° C. (Yield: 61.4 g=10%).

The resultant slightly brown polymer had a Mooney value (125° C., 1+8') of 94 and a gel content of 37%. The intrinsic viscosity of the soluble fractions was 1.64 dl/g.

Example 13

600 g of isobutene and 13.63 g (200 mmol) of isoprene were introduced into a vessel under argon at a temperature of −40° C. 8 ml of initiator solution, produced in the same manner as in Example 4 with an ageing time of 2 h, were added in the presence of light. After a reaction period of 15 minutes, the exothermic reaction was terminated due to the increasing viscosity by adding a precooled solution of 1 g of 2,2'-methylene-bis(4-methyl-6-tert.-butylphenol) (Vulkanox BKF from Bayer AG, Leverkusen) in 250 ml of ethanol. Once the liquid had been decanted, the precipitated polymer was washed with 2.5 l of methanol, rolled out to a thin sheet and dried for 1 day under a vacuum at 50° C. (Yield: 76.7 g=12.5%).

The resultant slightly brown polymer had a Mooney value (125° C., 1+8') of 77 and a gel content of 49%. The intrinsic viscosity of the soluble fractions was 1.36 dl/g.

Example 14

As Example 13; polymerisation was performed in the absence of light. Yield was: 59.6 g=9.7%.

The resultant slightly brown polymer had a Mooney value (125° C., 1+8') of 67.5 and a gel content of 59%. The intrinsic viscosity of the soluble fractions was 1.0 dl/g.

Example 15

1000 ml of n-hexane, 200 g of isobutene and 75 mmol of isoprene were introduced into a vessel under argon at −40° C. and combined with 20 ml of initiator solution from Example 5. Conversion of 52% was achieved after 120 minutes stirring at −40° C. The product had a gel content of 30%, the intrinsic viscosity of the soluble fractions was 0.37 dl/g. The polymer was of a tacky consistency. $M_w$=400 kg/mol and $M_n$=8 kg/mol were determined by gel permeation chromatography. The long chain branched polymer fraction was determined at 5%.

Example 16 (Effect of different ageing times)

In order to demonstrate the effect of different initiator ageing times on the outcome of the polymerisations, the polymerisation from Example 9 was repeated, wherein the initiator used from Example 3 was aged for different periods. The results are summarised in the following table.

| Ageing period (days) | Yield (%) | Mooney value | Gel content (%) |
|---|---|---|---|
| 3 | 17 | 82 | 31.4 |
| 9 | 21.5 | 60.5 | 3.5 |
| 14 | 0 (no reaction!) | — | — |

Example 17 (Polymer tests)

500 g of polymer were produced in accordance with the instructions of Example 7. The material had a Mooney value of 51, a gel content of 2.1%, an $M_n$ of 31.8 kg/mol, an $M_w$ of 8590.7 kg/mol and an isoprene content of 2.2 mol. %.

A rubber compound was produced from this polymer on a laboratory mill in accordance with the following formulation:

| Substance | Quantity (phr) |
|---|---|
| Polymer | 100 |
| Carbon black N 660 | 65 |
| Sunpar 2280 | 22 |
| Stearic acid | 1 |
| Zinc oxide | 5 |
| Sulphur | 1.8 |
| Vulkacit Merkapto (MBT) | 0.5 |
| Vulkacit Thiuram (TMTD) | 1 |

A comparison compound was produced in accordance with the same formulation using Polysar Butyl 301 as the polymer. Both compounds were compared with each other both in the unvulcanised and the vulcanised (10 min at 180° C.) state. The results are summarised in the following tables.

| Property | Butyl 301 | Example 7 |
|---|---|---|
| Unvulcanised | | |
| Mooney relaxation (30 sec at 100° C.) (%) | 4.9 | 10.8 |
| Mooney scorch at 135° C. | 17.5 | 14.1 |
| Green strength 100% (MPa) | 0.3 | 0.29 |
| Green strength 300% (MPa) | 0.23 | 0.3 |
| Vulcanisation: Monsanto Rheometer MDR 2000 at 180° C. | | |
| MIN | 1.35 | 1.25 |
| Ts1 | 1.09 | 1.01 |
| T50 | 1.89 | 1.87 |
| T90 | 5.73 | 5.53 |
| MH | 10.58 | 10.05 |
| Vulcanised | | |
| Tear strength (MPa) | 12.62 | 11.71 |
| Elongation at break (%) | 623 | 549 |
| 100% modulus (MPa) | 1.55 | 1.86 |
| 300% modulus (MPa) | 4.99 | 5.99 |
| Hardness at 23° C. | 53 | 54 |
| Air permeability at 65° C. | 4.85 | 4.79 |

What is claimed is:

1. An initiator system comprising one or more aromatic or heteroaromatic, polycyclic hydrocarbons and a solution of vanadium tetrachloride aged for an efficient amount of time in an organic solvent, wherein the vanadium tetrachloride solution has a concentration of about 0.01 to 500 mmol per liter of the organic solvent and wherein the aged vanadium tetrachloride solution and the one or more polycyclic hydrocarbons are present in the initiator system in a molar ratio of about 100:1 to 1:100.

2. The initiator system according to claim 1, wherein the efficient amount of ageing time is at least one hour.

3. The initiator system according to claim 2, wherein the efficient amount of ageing time is between one and twenty-four hours.

4. The initiator system according to claim 1, wherein the aged solution of vanadium chloride is kept separate from the one or more polycyclic hydrocarbons until initiation of a polymerization reaction is desired.

5. The initiator system according to claim 1, wherein the solution of vanadium chloride is aged in the presence of natural or artificial light.

6. The initiator system according to claim 1, wherein the solution of vanadium chloride is aged in the absence of light.

7. The initiator system according to claim 1, wherein the one or more polycyclic hydrocarbons are optionally substituted with a substituent selected from the group consisting of alkyl, alkylene, halogen, cyano, nitro, alkoxy, and substituted phenyl.

8. The initiator system according to claim 7, wherein the one or more polycyclic hydrocarbons are naphthalene, anthracene, indene, coumarone, carbazole, N-vinylcarbazole, biphenyl, p-terphenyl, acenaphthene, acenaphthylene, fluoranthene, fluorene, phenanthrene, pyrene, octylated diphenylamine, or a mixture thereof.

9. The initiator system according to claim 1, wherein the organic solvent comprises at least one hydrocarbon having 4 to 20 carbon atoms and a boiling point of greater than −20° C.

10. A polymer or copolymer of an isoolefin having 4 to 16 carbon atoms and optionally, a monomer copolymerizable with the isoolefin having 4 to 16 carbon atoms, wherein the polymer or copolymer is prepared from the initiator system according to claim 1.

11. A process for initiating polymerization of an isoolefin having 4 to 16 carbon atoms, the process comprising the steps of:

a. admixing the isoolefin having 4 to 16 carbon atoms with one or more aromatic or heteroaromatic, polycyclic hydrocarbons, b. adding an aged solution of vanadium tetrachloride in an organic solvent to the admixture of step a), wherein the vanadium tetrachloride has a concentration of about 0.01 to 500 mmol per liter of the organic solvent, and wherein the aged vanadium tetrachloride and the one or more polycyclic hydrocarbons are present in a molar ratio of about 100:1 to 1:100.

12. The process according to claim 11, wherein the solution of vanadium tetrachloride is aged for at least one hour.

13. The process according to claim 12, wherein the solution of vanadium tetrachloride is aged for between one and twenty-four hours.

14. The process according to claim 11, wherein the solution of vanadium chloride is aged in the presence of natural or artificial light.

15. The process according to claim 11, wherein the solution of vanadium chloride is aged in the absence of light.

16. The process according to claim 11, wherein the one or more polycyclic hydrocarbons are optionally substituted with a substituent selected from the group consisting of alkyl, alkylene, halogen, cyano, nitro, alkoxy, and substituted phenyl.

17. The process according to claim 16, wherein the one or more polycyclic hydrocarbons are naphthalene, anthracene, indene, coumarone, carbazole, N-vinylcarbazole, biphenyl, p-terphenyl, acenaphthene, acenaphthylene, fluoranthene, fluorene, phenanthrene, pyrene, octylated diphenylamine, or a mixture thereof.

18. The process according to claim 11, wherein the organic solvent comprises at least one hydrocarbon having 4 to 20 carbon atoms and a boiling point of greater than −20° C.

19. The process according to claim 11, wherein the admixture of step a) further comprises a polymerization solvent.

20. A polymer or copolymer of an isoolefin having 4 to 16 carbon atoms and optionally, a monomer copolymerizable with the isoolefin having 4 to 16 carbon atoms, wherein the polymer or copolymer is prepared from the process according to claim 11.

* * * * *

UNITED STATES PATENT AND TRADEMARK OFFICE
CERTIFICATE OF CORRECTION

PATENT NO. : 6,015,841
DATED : January 18, 2000
INVENTOR(S) : Gerhard Langstein, et al It is certified that error appears in the above-identified patent and that said Letters Patent is hereby corrected as shown below:

In the Claims

In claim 1, line 4 (column 9, line 47), insert the word -- aged -- before the word "vanadium".

In claim 1, line 6 (column 9, line 49), insert a comma -- , -- after the word "solvent".

Signed and Sealed this

Ninth Day of January, 2001

Attest:

Attesting Officer

Q. TODD DICKINSON
Commissioner of Patents and Trademarks